Aug. 7, 1962 J. J. NYBERG 3,048,707

SUPERCONDUCTIVE SWITCHING ELEMENTS

Filed Jan. 7, 1958 2 Sheets-Sheet 1

INVENTOR.
JAMES J. NYBERG
BY Robert H. Fraser
ATTORNEY.

INVENTOR.
JAMES J. NYBERG
BY Robert H. Fraser
ATTORNEY.

United States Patent Office 3,048,707

Patented Aug. 7, 1962

3,048,707

SUPERCONDUCTIVE SWITCHING ELEMENTS

James J. Nyberg, Torrance, Calif., assignor, by mesne assignments, to Thompson Ramo Wooldridge Inc., Cleveland, Ohio, a corporation of Ohio Filed Jan. 7, 1958, Ser. No. 707,605

7 Claims. (Cl. 307—88.5)

This invention relates to electrical circuits employing superconductive elements and more particularly to an electrical circuit in which the current flowing through one conductor effects a control over the current flowing through a second conductor by switching the second conductor between a state of superconductivity and a state of electrical resistivity.

In the investigation of the electrical properties of materials at very low temperatures, it has been found that the electrical resistance of many materials drops abruptly as the temperature is lowered near absolute zero (0° Kelvin). That the electrical resistance of a material exhibiting this phenomenon is actually zero, or so near to it as to be undetectable by measurement, has been well illustrated by the experiments of S. C. Collins at the Massachusetts Institute of Technology where a relatively large current induced in a lead ring continued to flow without any detectable decay for a period of well over two years. The phenomenon is known as superconductivity and the temperature at which the change occurs from a normally resistive state to a superconductive state is known as the transition temperature. Practical utilization of the phenomenon of superconductivity has been delayed by the difficulty in maintaining extremely low temperatures continuously on a commercial scale. However, recently the equipment for liquifying gases such as hydrogen has been vastly improved so that practical utilization of electrical circuits employing superconductive elements is now feasible.

An area of endeavor in the electrical arts in which there is a need for improved electrical components and circuits of reduced size and increased speed is that of data processing and digital computer systems. In such systems, digital information is frequently represented by an electrical current which may be passed through a myriad of electrical circuits to perform computations and manipulations of a complexity and magnitude which would be impractical by any manual means.

Accordingly, an object of the present invention is to provide a new and improved circuit utilizing superconductive elements.

An additional object of the invention is to provide an electrical circuit in which the flow of current through one portion of the circuit functions to switch another portion of the circuit between an electrically resistive and a superconductive state.

It is another object of the invention to provide a new and improved circuit for performing logical functions by means of superconductive circuit elements in which an electrically resistive state is established in accordance with condition representing currents.

It is a further object of the invention to provide a new and improved bi-stable electrical circuit utilizing superconductive elements.

Briefly, in accordance with the invention, an inner conductor and an outer conductor are coaxially disposed with the conductors being constructed of materials having dissimilar transition temperatures at which the materials change from a normally resistive state to a superconductive state. Through the passage of control currents through one of the conductors which produce a magnetic field, the other of the conductors is switched from a superconductive to an electrically resistive state. For example, in one embodiment of the invention illustrated herein, a pair of conductors are coaxially arranged with the inner conductor receiving a control current which generates a magnetic field to cause the outer conductor to be rendered electrically resistive.

Circuits to perform logical functions in accordance with the invention may be constructed in which the control currents supplied to the inner conductor represent external conditions so as to render the outer conductor electrically resistive only upon a concurrence of all of the external conditions or upon an occurrence of a single one of the external conditions. Another example of the circuit of the invention illustrated herein is a bi-stable device in which a pair of concentric conductors are interconnected so that one stable mode of operation is achieved when a given conductor is electrically resistive and another stable mode of operation is achieved when the conductor is rendered superconducting.

A better understanding of the invention may be had upon a reading of the following detailed description and an inspection of the drawings, in which.

As noted above, at temperatures near absolute zero, some materials lose all resistance to the flow of electrical current and become perfect conductors. The phenomenon is called superconductivity and the temperature at which the change occurs from a normally resistive state to the superconductive state is called the transition temperature. For example, the following materials have a transition temperature and become superconductive at the temperature listed:

| | ° Kelvin |
|---|---|
| Mercury | 4.12 |
| Niobium | 8 |
| Lead | 7.2 |
| Vanadium | 5.1 |
| Tantalum | 4.4 |
| Tin | 3.7 |
| Aluminum | 1.2 |
| Titanium | 0.5 |

Only a few of the materials exhibiting superconductivity are listed above. Other elements and many alloys and compounds become superconductive at temperatures ranging between 0° and 17° Kelvin. A discussion of many such materials may be found in a book entitled "Superconductivity" by D. Schoenberg, Cambridge University Press, Cambridge, England, 1952.

The above listed transition temperatures apply only where the materials are in a substantially zero magnetic field. In the presence of a magnetic field the transition temperature is decreased so that a given material may be in an electrically resistive state even for temperatures below the normal transition temperature at which the material would be superconductive in the absence of a magnetic field.

In addition, the above listed transition temperatures apply only for values of electrical current flow which do not exceed a critical value. When a current flows through a material in excess of a critical value, the transition temperature is decreased so that the material is electrically resistive even though the temperature of the material is lower than the normal transition temperature at which the material would otherwise be superconductive. The action of a current in lowering the temperature at which a transition occurs from normal electrical resistivity to superconductivity is similar to the lowering of the transition temperature by a magnetic field for the reason that the current flowing in the material generates a magnetic field having a strength which if externally applied would lead to the same result in lowering the transition temperature.

Accordingly, when a material is held at a temperature below its normal transition temperature for a zero magnetic field, the superconductive condition of the material may be extinguished by application of a magnetic field which may originate in an external source or may be internally generated through the flow of current in the material.

Figure 1:
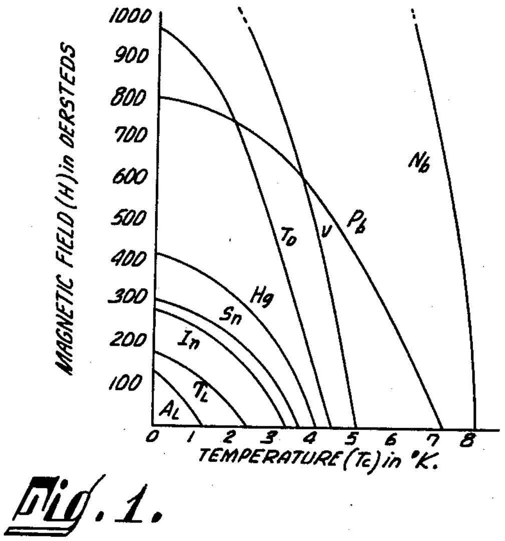
FIG. 1 is a graph illustrating the variation in transition temperatures for various materials when subjected to an increasing magnetic field.

FIG. 1 illustrates the variation in transition temperatures ($T_c$) for several materials as a function of an applied magnetic field. In the absence of a magnetic field the point at which each of the several curves intersects the abscissa is the transition temperature at which the material becomes superconductive given in degrees Kelvin. For values of temperature and magnetic field falling beneath each of the several curves, the particular material is superconductive while for values of temperature and magnetic field falling above the curve the material possesses electrical resistance.

Figure 2:
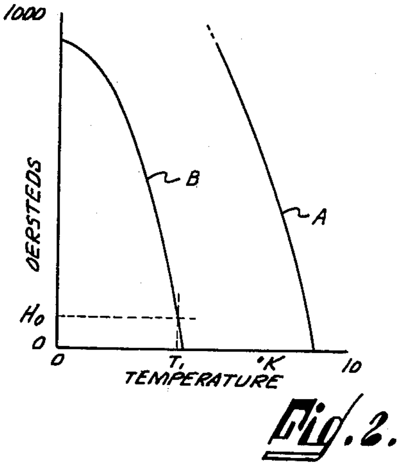
FIG. 2 is a graph of the transition temperatures of two particular materials as a function of an increasing magnetic field.

The effect of varying the magnetic field applied to a particular material while maintaining the material at a constant temperature lower than the transition temperature is illustrated in curve A of FIG. 2 where the dashed line $T_1$ represents a constant temperature line. For a magnetic field greater than the value of the point of intersection between the line $T_1$ and the curve, the particular material is electrically resistive. However, for a magnetic field having a value less than the point of intersection between the line $T_1$ and the curve, the material is superconductive.

Figure 3:
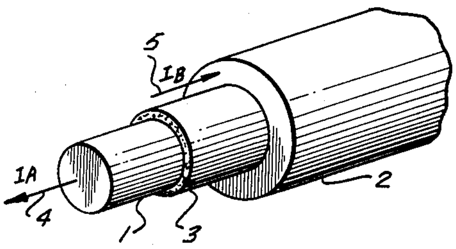
FIG. 3 is an enlarged perspective view of a portion of a superconductive element in accordance with the invention.

FIG. 3 is an enlarged perspective view of a portion of a superconductive element which is adapted to operate in accordance with the foregoing principles. The element of FIG. 3 comprises an inner conductor in the form of a cylindrical wire 1 which may be constructed of a material which is capable of becoming superconductive when operating at a suitable low temperature. Surrounding the inner conductor 1 is a tubular conductor 2 which may also be constructed of a material which is capable of becoming superconductive at the operating temperature of the device. Between the inner conductor 1 and the outer conductor 2, a layer of insulating material 3 which retains its insulating characteristic at the operating temperature of the device maintains the inner conductor 1 and the outer conductor 2 electrically separate.

FIG. 2 illustrates the relationship between the transition temperatures of suitable materials of which the inner conductor 1 and the outer conductor 2 may be constructed. The transition temperature of the inner conductor as a function of an applied magnetic field is illustrated by the curve A, while the transition temperature of the outer conductor 2 as a function of an applied magnetic field is illustrated by the curve B. Accordingly, the outer conductor 2 is constructed of a material which has a lower transition temperature for a zero magnetic field than the inner conductor 1. The result is that the outer conductor 2 is capable of being switched between an electrically resistive state and a superconductive state when subjected to a magnetic field which does not affect the superconductive state of the inner conductor 1.

Assuming for the moment that a current $I_A$ is flowing through the inner conductor in the direction indicated by the arrow 4 and that a current $I_B$ is flowing through the outer conductor 2 in the direction indicated by the arrow 5, the magnetic fields produced by the currents are in opposition to each other and the outer conductor 2 will be superconductive if the net magnetic field in it is smaller in magnitude than a critical value of magnetic field $H_0$ at the temperature at which the element is being operated as indicated in FIG. 2.

Figure 4:
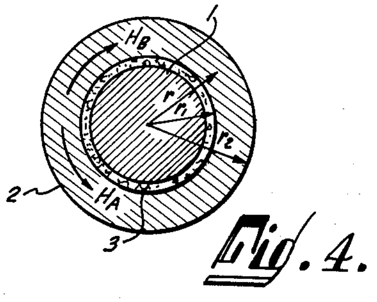
FIG. 4 is a cross-sectional view of the superconductive element of FIG. 3.

The magnetic field produced by the current $I_A$ may be labeled $H_A$ while the magnetic field produced by the current $I_B$ may be labeled $H_B$. The opposite polarities of the magnetic fields $H_A$ and $H_B$ in the outer conductor 2 are illustrated in FIG. 4. At a radius $r$ between $r_1$ and $r_2$ in FIG. 4, the field $H_A$ established by the current $I_A$ flowing through the inner conductor 1 is given by the following equation:

$$H_A = \frac{I_A}{2\pi r} \text{ amperes per meter}$$

If it is assumed that $r_m$ is the inside radius of a superconductive region of the outer conductor 2 and that the current $I_B$ through the outer conductor 2 is uniformly distributed, then for $r_1 < r_m < r < r_2$ the field $H_B$ established by the current $I_B$ through the outer conductor 2 is given by the following equation:

$$H_B = \frac{I_B(r^2 - r_m^2)}{2\pi r(r_2^2 - r_m^2)}$$

As noted above, the outer conductor 2 will be superconductive if $(H_A - H_B) < H_0$.

Figure 5:
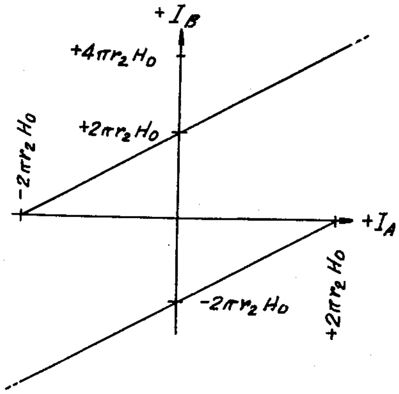
FIG. 5 is a graphical illustration of the threshold between an electrically resistive state and a superconductive state for the outer conductor as a function of current flow through the inner conductor of the superconductive element of FIG. 3.

FIG. 5 illustrates the threshold between a superconductive state and a state of electrical resistance for various relationships between the currents $I_A$ and $I_B$. Where the relationship between the currents $I_A$ and $I_B$ falls between the two generally parallel lines, the outer conductor 2 is in a superconductive state. On the other hand, where the relationship between the currents $I_A$ and $I_B$ falls outside the region defined by the generally parallel lines, the outer conductor 2 is electrically resistive.

The circuit elements of FIGS. 3 and 4 may be employed as a unilateral conduction device when a bias current $I_A$ is passed through the inner conductor 1 having a magnitude slightly less than the value at which the outer conductor 2 is rendered electrically resistive when the current $I_B$ in the outer conductor is equal to zero. Thus, if $I_A$ is equal to a value slightly less than $2\pi r_2 H_0$, a current $-I_B$ flowing through the outer conductor 2 generates a magnetic field which causes the outer conductor 2 to become electrically resistive since the field is additive with respect to the magnetic field generated by the current $I_A$. On the other hand, where a current $+I_B$ flows through the outer conductor 2 to generate a magnetic field which is subtractive with respect to the magnetic field generated by the bias current $I_A$ through the inner conductor 1, a substantial current $+I_B$ may pass through the outer conductor 2 without rendering the outer conductor 2 electrically resistive.

Figure 7:
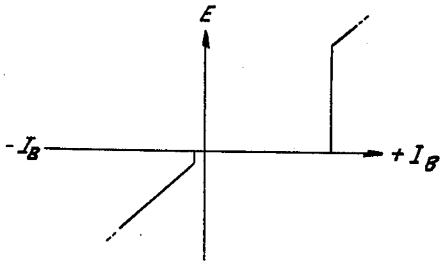
FIG. 7 is a graph illustrating the variation in voltage appearing across a portion of the circuit of FIG. 6 as a function of current flow.

The relationship between the voltage appearing across the outer conductor 2 as a function of current flow therethrough where a bias current is flowing through the inner conductor 1 is illustrated in FIG. 7. Thus, over a range of values of current flow through the outer conductor, a superconductive state obtains in the outer conductor. However, for excessive values of $+I_B$ or relatively small values of $-I_B$, the outer conductor 1 is rendered electrically resistive and a voltage appears. Accordingly, as illustrated in FIG. 7, the circuit element of FIGS. 3 and 4 is a unilateral conduction device when a bias current is passed through the inner conductor 1. A device which operates on somewhat the same principle but whose construction differs from the device of FIGS. 3 and 4 is illustrated in U.S. Patent 2,666,884 entitled, "Rectifier and Converter Using Superconduction."

The superconductive circuit element illustrated in FIGS. 3 and 4 may be constructed by depositing both the insulating layer 3 and the outer tubular conductor 4 as thin coatings on a very finely drawn wire which comprises the inner conductor 1. It is contemplated that the circuit element may be produced in relatively long lengths from which selected pieces of any length may be cut for use in a particular circuit application. By means of the Wolliston process, the inner conductor may be drawn to a size smaller than that normally possible in a conventional wire drawing die. In accordance with the process, a wire is placed in a tube of another material to increase its diameter and then drawn through a die which compresses the tube and the inner portion to a diameter smaller than that which could be achieved by passing the wire directly through a die.

Ordinarily, the tubular material is then removed by some suitable solvent. However, in the fabrication of the circuit element illustrated in FIGS. 3 and 4 it may be possible to apply the insulating layer 3 and the outer conductor 2 prior to the passage of the circuit element through the die to reduce the size of the inner conductor 1. By choosing a very small diameter of inner wire, such as for example one having a diameter in the range of .0002 inch–.003 inch and a thin tubular conductor of less than .001 inch thickness on top of a thin insulating layer of the order of .00045 inch thickness, a circuit element may be constructed of very small size which presents a substantial electrical resistance to the flow of current when in an electrically resistive state and which may be readily switched from a superconductive to an electrically resistive state due to the high concentration of magnetic fields.

Figure 6:
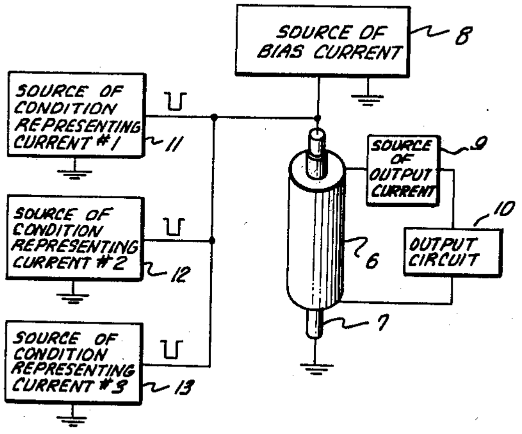
FIG. 6 is a combined block and schematic diagram of a logical circuit in accordance with the invention.

In FIG. 6 there is shown a logical circuit including a superconductive element having an outer conductor 6 and an inner conductor 7. Through the inner conductor 7 passes a bias current from the source of bias current 8 of a magnitude larger than the threshold value of $2\pi r_2 H_0$, so that the outer conductor 6 is rendered electrically resistive to impede the flow of current from a source of output current 9 through an output circuit 10.

In addition to the bias current from the source 8 there may be applied to the inner conductor 7 condition representing currents derived from several sources 11, 12 and 13. Where the current flowing from the source of bias current 8 is in one given direction, the current flowing from the condition representing sources 11, 12 and 13 may each be arranged to be subtractive with respect to the bias current. Therefore, while the tendency of the bias current is to retain the outer conductor 6 in an electrically resistive state, the tendency of the currents from the sources 11, 12 and 13 is to reduce the net current flowing through the inner conductor 7 to a level at which the outer conductor 6 becomes superconductive. By proper selection of the magnitudes of the currents from the bias current source 8 and the condition representing current sources 11, 12 and 13, the circuit of FIG. 6 may be arranged to function as either a logical "AND" circuit or a logical "OR" circuit.

For example, for "And" circuit operation the concurrence of all of the currents from the condition representing sources 11, 12 and 13 is required to reduce the net current flow through the inner conductor 7 to a level at which the outer conductor 6 is rendered superconductive to allow current to flow from the source of output current 9 via an unimpeded path to the output circuit 10. On the other hand, by arranging the amplitudes of each of the currents from the condition representing sources 11, 12 and 13 to be large enough to reduce the current flow through the inner conductor 7 to a level at which the outer conductor becomes superconductive, the appearance of any one current representing the occurrence of an external condition allows a current to flow unimpeded through the output circuit 10 so that the circuit functions as an 'OR" circuit.

Although a simple logical circuit has been illustrated in FIG. 6 in accordance with the invention, it will be appreciated that operations of greater complexity may be readily performed through a combination of circuits similar to FIG. 6 or a modification of the manner in which the current through the inner conductor is established in accordance with the occurrence or concurrence of any one or more external conditions.

Figure 8:
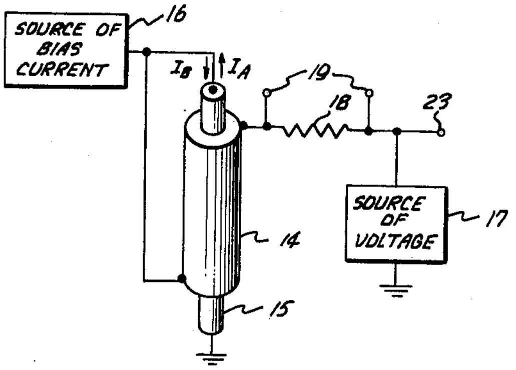
FIG. 8 is a combined block and schematic diagram of a bi-stable circuit in accordance with the invention.

In FIG. 8 there is shown another embodiment of the invention in which a superconductive circuit element having an outer conductor 14 and an inner conductor 15 is arranged to function as a bi-stable circuit. In FIG. 8 a current $I_A$ flows through an inner conductor 15 from a source of bias current 16. In addition, a current $I_B$ from a source of voltage 17 flows through a series circuit comprising a resistance 18, the outer conductor 14 and the inner conductor 15. As indicated in FIG. 8, the direction of the current $I_B$ flowing through the inner conductor 15 is opposite to the current $I_A$. Accordingly, the condition of conductivity of the outer conductor 14 is determined by the combination of the currents $I_A$ and $I_B$ through the inner conductor 15 and the current $I_B$ through the outer conductor 14. In order for the outer conductor 14 to be entirely superconductive, it is necessary that $I_B > I_A - 2\pi r_2 H_0$ and to have superconductivity at a radius less than $r_2$ it is necessary that $$I_B < \frac{1}{2}(2\pi r_2 H_0 + I_A)$$

Figure 9:
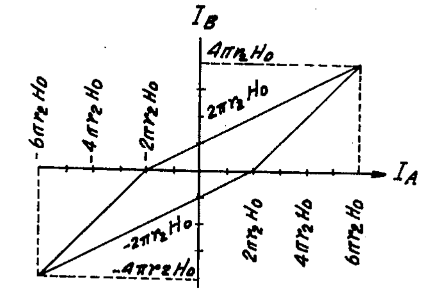
FIG. 9 is a graph illustrating the threshold between a state of superconductivity and a state of electrical resistance occurring in the circuit of FIG. 8 as a function of current flow.

The threshold between a condition of superconductivity and a condition of electrical resistance in the outer conductor 14 of FIG. 8 as a function of the combined effect of the currents $I_A$ and $I_B$ is illustrated in FIG. 9. In FIG. 9, values of $I_A$ and $I_B$ which fall within the enclosed traverse produce a superconductive state in the outer conductor 14 of FIG. 8 so that the flow of current establishes a relatively large voltage across the resistor 18 and the terminals 19. On the other hand, where the values of the currents $I_A$ and $I_B$ fall outside the enclosed traverse of FIG. 9, less current flows and a smaller voltage appears at the terminals 19. However, due to the interaction of the currents $I_A$ and $I_B$ in the circuit of FIG. 8, only two stable modes of operation may be sustained.

Figure 10:
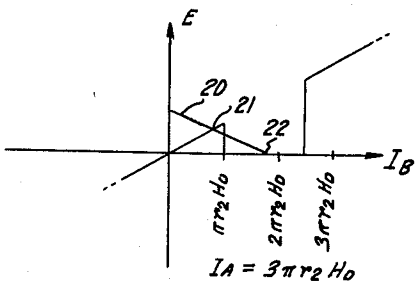
FIG. 10 is a graphical illustration of the relationship between a voltage and a current in the circuit of FIG. 8.

As indicated in FIG. 10, the voltage-current characteristic illustrates that the circuit of FIG. 8 is stable when the outer conductor 14 is superconductive and $$I_B < \pi r_2 H_0$$

In addition, the circuit of FIG. 8 is stable when the outer conductor 14 is resistive and $$\pi r_2 H_0 < I_B < 2\frac{1}{2}\pi r_2 H_0$$

The line 20 of FIG. 10 comprises a conventional load line which represents the voltage-current characteristic of the resistance 18 and the source of voltage 17. As is well known, where the curve representing the voltage-current relationship of a device intersects a load line, a stable condition of operation is established if the slope of the load line is negative and the slope of the curve in intersecting the load line is not negative. Accordingly, FIG. 10 illustrates that a stable state is established at the intersection point 21 where the outer conductor 14 of FIG. 8 is electrically resistive with a relatively low voltage appearing at the terminals 19. In addition, FIG. 10 illustrates that a stable state is established at the intersection point 22 where the outer conductor 14 is superconductive with a relatively large voltage appearing at the terminals 19.

Where the source of bias current 16 of FIG. 8 remains constant, the device may be switched from one stable state to the other by varying the magnitude of the current $I_B$. Such a variation may be achieved, for example, by applying pulses of suitable polarity to a terminal 23. In the apparatus of FIG. 8 the basic current gain would ordinarily be equal to one since equal values of $I_A$ and $I_B$ produce equal magnetic fields at a distance equal to the radius $r_2$ which corresponds to the surface of the outer conductor 14.

Although in the illustrative logical circuits of FIGS. 6 and 8 a superconductive circuit element is illustrated having a single inner conductor and a single outer conductor, various alternative arrangements may be possible in which several concentric conductors are disposed within an outer conductor in which one or more of the conductors is switched between a superconductive and a resistive state by applying currents to others of the conductors.

Figure 11:
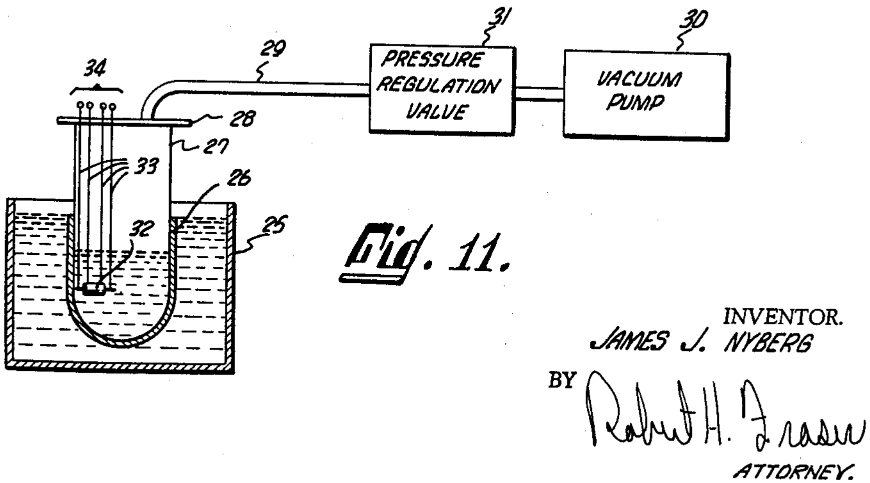
FIG. 11 is a diagrammatic view of apparatus for maintaining the electrical circuits of the invention at a selected low temperature, near absolute zero.

FIG. 11 is a diagrammatic illustration of an arrangement for maintaining the circuits of the present invention at a suitable low temperature near absolute zero. In FIG. 11 there is shown an exterior insulated container 25 which is adapted to hold a coolant such as liquid nitrogen. Within the container 25 an inner insulated container 26 is suspended for holding a coolant such as liquid helium which maintains the circuits of the invention at a proper operating temperature. Since the boiling point of helium is 4.2° Kelvin, that operating temperature may be readily sustained. In order to achieve other operating temperatures, the top of the container 26 may be sealed by a sleeve 27 and lid 28 through which a conduit 29 connects the inner chamber with a vacuum pump 30 and a pressure regulation valve 31. The pump 30 functions to lower the atmospheric pressure within the chamber to control the temperature of the helium. The pressure regulation valve 31 functions to regulate the pressure within the chamber so that the temperature is held constant. One or more circuits 32 of the invention may be suspended in the liquid helium at the proper operating temperature at which the circuit components are superconductive. Connection to the circuits 32 is made by lead-in wires 33 which also may be constructed of a superconductive material within the cooled region to minimize resistance. The lead-in wires 33 extend through the lid 28 to the terminals 34.

The superconductive elements and circuits of FIGS. 3, 4, 6 and 8 are intended to be examples only of arrangements which utilize the concept of the invention. Therefore, the invention is not limited thereto since the exemplary circuits may be modified or combined to adapt the invention to a particular use. Accordingly, the invention should be accorded the full scope of the annexed claims including the particular embodiments illustrated in the drawings and described herein as well as all equivalents thereof.

What is claimed is:

1. A circuit element including the combination of a control wire constructed of a first material which is superconductive for current flow therethrough up to a critical current value, a tubular conductor coaxially disposed with respect to the control wire and constructed of a second material which is capable of being switched between a superconductive and a resistive state in response to a magnetic field surrounding the control wire, said control wire and said tubular conductor exhibiting different values of critical magnetic field at which they may be switched between superconductive and normally resistive states at a given temperature, and means for varying the current flow through the control wire over a range of values less than said critical current value to vary the surrounding magnetic field whereby the tubular conductor is selectively switched between a superconductive state and a resistive state.

2. A circuit element including the combination of a central control wire constructed of a first material which is superconductive for current flow therethrough up to a critical current value, a tubular conductor coaxially disposed with respect to the control wire and constructed of a second superconductive material, said control wire and said tubular conductor exhibiting different values of critical magnetic field for which they may be switched between superconductive and resistive states at a given operating temperature, means disposed between the control wire and the tubular conductor for insulating the tubular conductor from the control wire at the operating temperature of the circuit element, and means for varying the current flow through the control wire over a range less than said critical current value to vary the surrounding magnetic field whereby the tubular conductor is selectively switched between a superconductive state and a resistive state.

3. A circuit element including the combination of at least one inner conductor, at least one outer conductor which is coaxially disposed with respect to the inner conductor, said inner and outer conductors being constructed of different materials having higher and lower critical magnetic field values respectively, means for maintaining the inner and outer conductors at a temperature below the transition temperatures thereof, means for insulating the conductors from each other at the operating temperature thereof, and means for establishing a control current through at least one of the conductors to vary the surrounding magnetic field whereby at least one other of the conductors is selectively switched between a superconductive state and a resistive state.

4. A circuit element including the combination of an inner conductor constructed of a material having a particular value of critical magnetic field for which a conductor may be switched from the superconductive to the resistive state, an outer conductor which is coaxially disposed with respect to the inner conductor and constructed of a material which has a lower value of critical magnetic field, means for maintaining the inner and outer conductors at an operating temperature below the transition temperatures of said conductors, and means for establishing a control current through the inner conductor to vary the surrounding magnetic field whereby the outer conductor is selectively switched between a superconductive state and a resistive state.

5. A circuit element including the combination of a central control wire which is superconductive for current therethrough up to a critical current value, a tubular conductor coaxially disposed with respect to the control wire and superconductive below a particular transition temperature, said control wire and said tubular conductor being constructed of different materials having higher and lower critical magnetic field values respectively, and means for varying the current flow through the control wire within a range less than said critical current value to vary the surrounding magnetic field whereby the tubular conductor is selectively switched between a superconductive state and a resistive state.

6. A circuit element including the combination of a central control wire having a diameter within the range of from .0002 inch to .003 inch, a tubular conductor of less than .001 inch thickness coaxially disposed with respect to the control wire, an insulating layer having a thickness of the order of .00045 inch disposed between the tubular conductor and the control wire, said control wire and said tubular conductor being constructed of different materials and exhibiting higher and lower critical magnetic field values respectively, and means for varying the current flow through the control wire over a range of current values less than said critical current value in order to vary the surrounding magnetic field whereby the tubular conductor is selectively switched between a superconductive state and a resistive state.

7. A circuit element including the combination of a central control wire having a diameter within the range of from .0002 inch to .003 inch, a tubular conductor of less than .002 inch thickness coaxially disposed with respect to the control wire, an insulating layer having a thickness of the order of .00045 inch disposed between the tubular conductor and the control wire, said control wire and said tubular conductor being constructed of dissimilar materials exhibiting different magnetic field values, the transition temperature of the tubular conductor being approximately one-half the transition temperature of the control wire, and means for varying the current flow through the control wire within a predetermined range of current values in order to vary the surrounding magnetic field whereby the tubular conductor is selectively switched between a superconductive state and a resistive state without switching the control wire to a resistive state.

References Cited in the file of this patent

UNITED STATES PATENTS

| | | |
|---|---|---|
| 2,666,884 | Ericsson | Jan. 19, 1954 |
| 2,832,897 | Buck | Apr. 29, 1958 |
| 2,935,694 | Schmitt et al. | May 3, 1960 |
| 2,969,469 | Richards | Jan. 24, 1961 |

OTHER REFERENCES

The Crytron, a Superconductive Computer Component, Proceedings of the IRE, April 1956, pages 482–493.

Digital Computer Components & Circuits by R. K. Richards, D. Van Nostrand Co. Inc. 1957.

UNITED STATES PATENT OFFICE

CERTIFICATE OF CORRECTION

Patent No. 3,048,707 August 7, 1962

James J. Nyberg

It is hereby certified that error appears in the above numbered patent requiring correction and that the said Letters Patent should read as corrected below.

Column 9, line 10, for ".002" read -- .001 --.

Signed and sealed this 20th day of November 1962.

(SEAL)
Attest:

ERNEST W. SWIDER
Attesting Officer

DAVID L. LADD
Commissioner of Patents

Notice of Adverse Decision in Interference

In Interference No. 93,809 involving Patent No. 3,048,707, J. J. Nyberg, SUPERCONDUCTIVE SWITCHING ELEMENTS, final judgment adverse to the patentee was rendered Feb. 19, 1965, as to claims 1, 2, 3, 4 and 5.

[*Official Gazette March 30, 1965.*]